F. A. FALK.
CREAM SEPARATOR.
APPLICATION FILED MAR. 23, 1914.
1,120,464.
Patented Dec. 8, 1914.
2 SHEETS—SHEET 1.
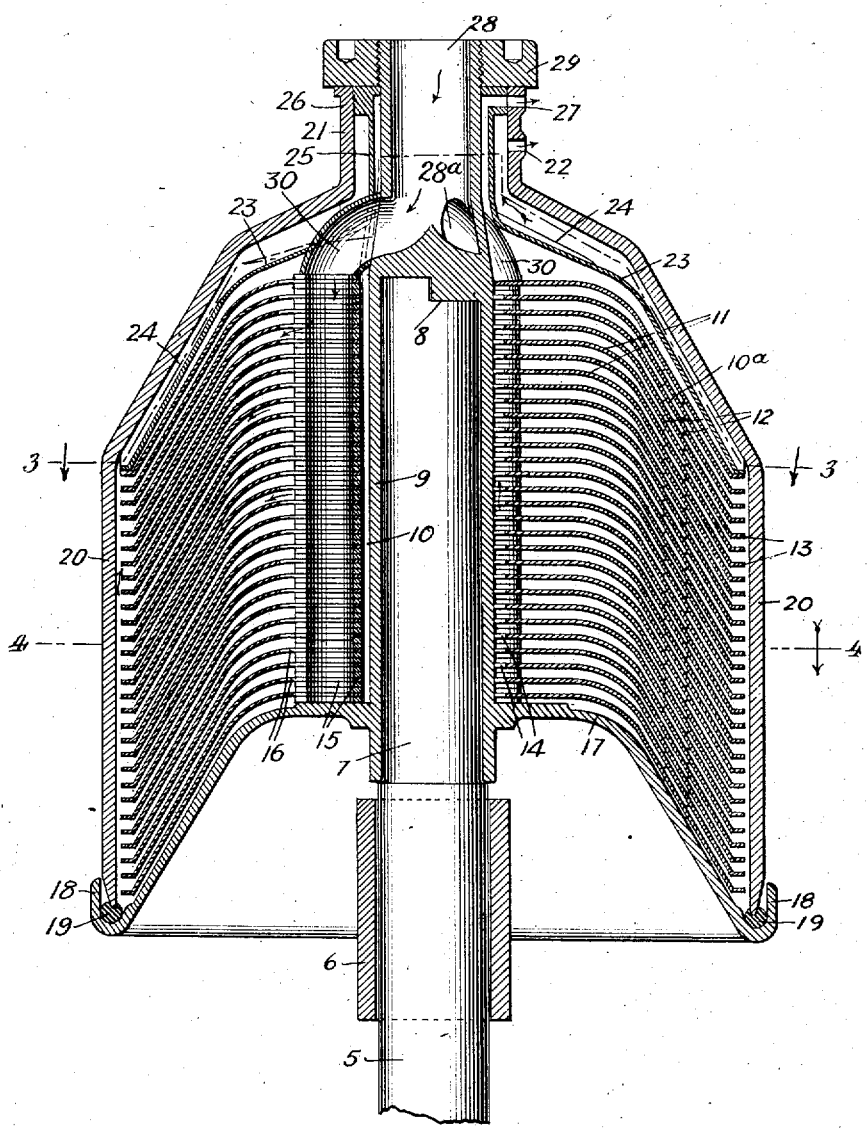
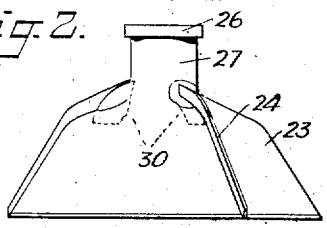
WITNESSES
William P. Goebel.
Walton Harrison
INVENTOR
FRANK A. FALK
BY Munn & Co
ATTORNEYS F. A. FALK.
CREAM SEPARATOR.
APPLICATION FILED MAR. 23, 1914.
1,120,464.
Patented Dec. 8, 1914.
2 SHEETS—SHEET 2.
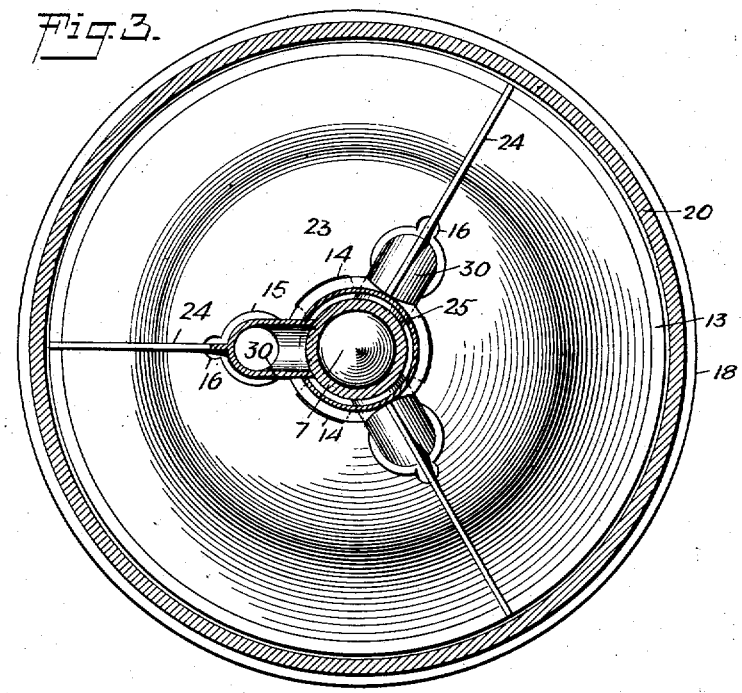
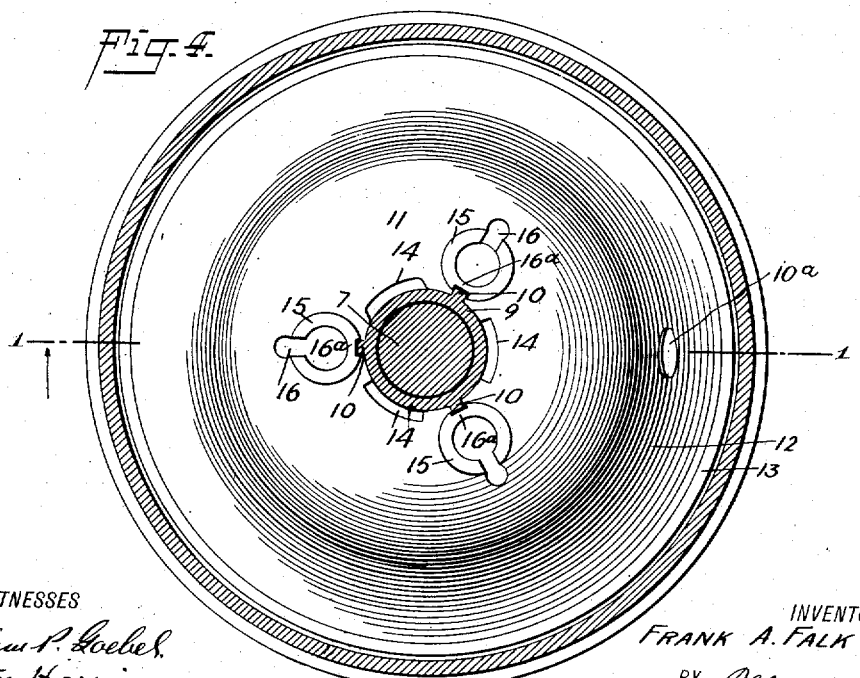
WITNESSES
William P. Goebel
Walton Harrison
INVENTOR
FRANK A. FALK
BY
ATTORNEYS

UNITED STATES PATENT OFFICE.

FRANK A. FALK, OF STACYVILLE, IOWA.

CREAM-SEPARATOR.

1,120,464. Specification of Letters Patent. Patented Dec. 8, 1914.

Application filed March 23, 1914. Serial No. 826,531.

*To all whom it may concern:*

Be it known that I, FRANK A. FALK, a citizen of the United States, residing at Stacyville, in the county of Mitchell and State of Iowa, have invented certain new and useful Improvements in Cream-Separators, of which the following is a specification.

My invention relates to the separation of light portions of liquids from heavier portions thereof, and particularly to the separation of cream from milk.

More particularly stated, my invention comprehends an improved construction of separator making use of centrifugal force, the various movable parts of the separator being so arranged as to render the separation as nearly positive as possible, and to prevent the mixture of the cream with the heavier portions of the milk after the separation of the cream therefrom.

My invention further relates to various improvements in separator construction, for the purpose of improving the general efficiency thereof.

Reference is made to the accompanying drawings forming a part of this specification, and in which like letters indicate like parts.

Figure 1 is a vertical cross section through my improved cream separator, and is taken upon the line 1—1 of Fig. 4, looking in the direction of the arrow. Fig. 2 is a detail view, showing in side elevation a guiding liner, forming a part of my device. Fig. 3 is a section, on the line 3—3 of Fig. 1, looking in the direction of the arrow. Fig. 4 is a section, on the line 4—4 of Fig. 1, looking in the direction of the arrow.

A driving shaft 5, engaging a bearing 6, is provided with a reduced portion 7 and with a shoulder 8. Encircling the portion 7 is a sleeve 9, the upper portion of which fits upon the shoulder 8 in order to prevent relative rotary movement between the shaft and the sleeve.

The sleeve 9 carries a number of ribs 10 extending along its general length. Encircling the sleeve 9 are a number of liners 11, each provided with a slanting portion 12 and with a flat peripheral annular portion 13. The liners are also severally provided with slots 14, these slots alternating with the ribs.

Each dome 11 carries a number of eyelets 15, and is provided with a slot 16 extending through the wall of the eyelet and merging into the open area thereof, as indicated in Fig. 4. Each eyelet 15 is further provided with a notch 16ª, for slidably engaging some one of the ribs 10. The sleeve 9 also carries a bottom plate 17, which is of greater thickness than the liners 11 and forms the bottom of the separator. This bottom is provided with an upwardly extending edge 18.

A casing wall 20 is provided with a neck portion 21, the latter having a hole 22 extending radially outward. Located in the upper portion of the casing wall 20 is a liner 23, provided with a number of radially extending guiding ribs 24, as may be understood from Fig. 3. The guiding liner 23 is provided with a neck portion 25, the latter having a comparatively thick annular edge 26. A hole 27 extends through this annular edge and also through the adjacent neck portion 21. The sleeve 9 carries a thimble 28, the upper end of which is threaded externally. The thimble 28 is provided with holes 28ª, in this instance three in number. Fitted upon this threaded portion is an annular nut 29.

In assembling the parts, they are arranged as indicated in Fig. 1. First, the various liners 11 are stacked one upon the other, the various eyelets 15 being alined, as shown in said figure, so as to constitute virtually three tubes of composite form. In doing this, the various slots 14 are brought into registry. The liners 11 may be placed in position one at a time, the ribs 10, fitting into the notches 16ª (see Fig. 4), serving to properly guide the liners 11 and prevent them from turning relatively to the sleeve 9.

The neck 25 carries three elbows 30, extending radially outward from it and also extending downwardly. These elbows are adapted to register with the eyelets 15, and also with the holes 28ª, as may be understood from Fig. 3. The parts being assembled, and the annular nut 29 being tightened, the various liners are held in proper registry with each other.

The operation of my device is as follows: Milk is poured into the thimble 28, and passes outwardly and downwardly through the elbows 30, into the composite tubes which are made up of the eyelets 15. Rotary motion being applied to the shaft 5, the sleeve 9 and parts carried by it are caused to rotate. The milk passes downwardly in the direction indicated by the arrows in Fig. 1, and flows radially outward through the slots 16. Under centrifugal action, the heavy portions of the milk flow farther outwardly and downwardly until they pass the annular portions 13 of the domes 11. They next pass upwardly and under guidance of the guiding liner 23, and ribs 24 flow into the neck portion 21 and thence outwardly through the hole 22, being thus discharged from the machine. The cream, however, because of its lightness, hugs closely around the sleeve 9, and flows upwardly through the slots 14, as indicated in Fig. 1. Passing upwardly between the neck 25 and the thimble 28, the cream makes its escape from the opening 27.

It is impossible for the cream and heavier portions of the milk to reunite within the machine, after being separated.

I do not limit myself to the precise mechanism shown, as variations may be made therein without departing from the spirit of my invention. Neither do I limit myself to any single use for the separator, as it may be employed in separating various liquids, and portions of the same liquid having different specific gravities.

Having thus described my invention, what I claim as new and desire to secure by Letters Patent is as follows:

1. In a separator bowl, the combination of an axially rotatable stem having an upper inlet thimble and a plurality of elbows extending therearound and depending from, and communicating with, the said thimble, a plurality of superposed liners around the stem having registering openings adjacent said stem and forming separate vertical milk inlet passages registering and communicating at their upper ends with the said inlet elbows, said liners also having registering openings immediately around the stem and forming cream passages, and means forming separate outlets for the cream and skim milk, all substantially as described.

2. In a separator bowl, the combination of an axially rotatable stem having an upper inlet thimble and a plurality of depending elbows communicating with the thimble, a plurality of liners superposed in spaced relation around the stem and having registering eyelets forming separate vertical milk inlet passages registering and communicating at their upper ends with the said elbows, said eyelets having side slots whereby to communicate with the spaces between the several liners, and said liners also having registering openings immediately around the stem and forming vertical cream passages, and means forming separate outlets for the cream and skim milk, all substantially as described.

In testimony whereof I have signed my name to this specification in the presence of two subscribing witnesses.

FRANK A. FALK.

Witnesses:
H. H. STELM,
A. HENNERMAN

Copies of this patent may be obtained for five cents each, by addressing the "Commissioner of Patents, Washington, D. C."